Feb. 12, 1929.
J. M. VOGEL
STIRRING DEVICE FOR LIQUIDS
Filed June 30, 1928
1,701,649
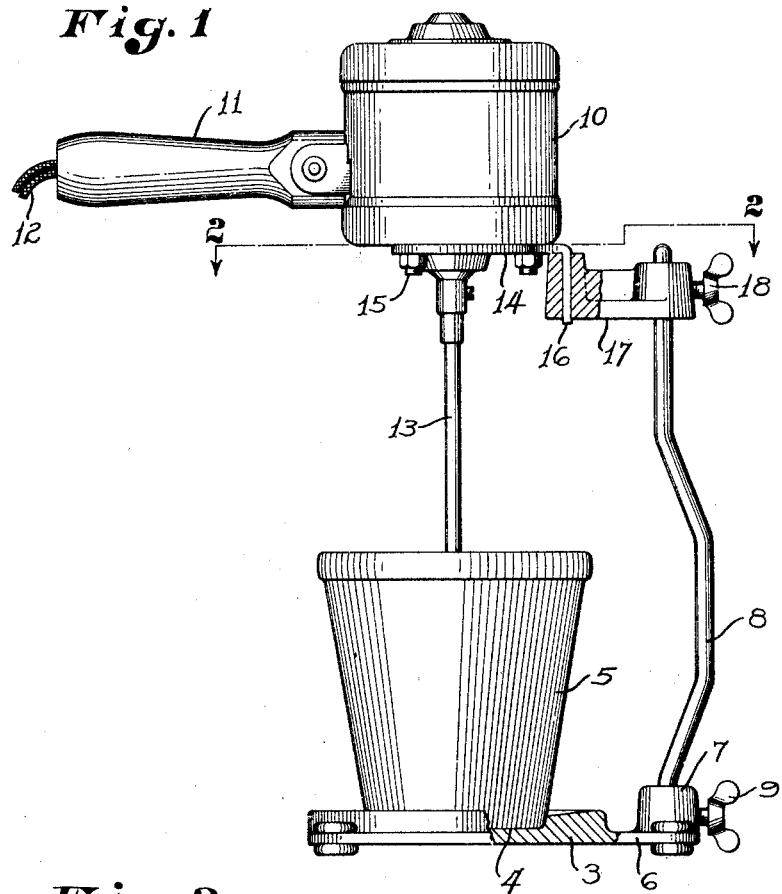
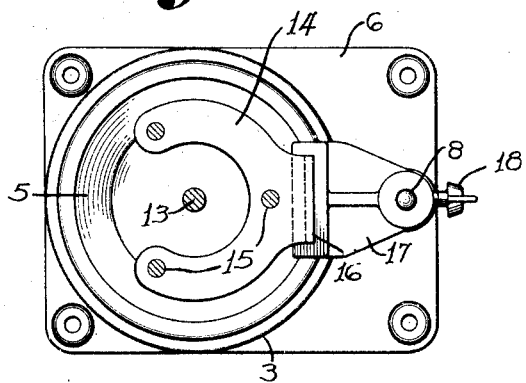
Inventor
Joseph M. Vogel,
By Owen & Owen,
Attorneys Patented Feb. 12, 1929.

1,701,649

UNITED STATES PATENT OFFICE.

JOSEPH M. VOGEL, OF ADRIAN, MICHIGAN, ASSIGNOR TO UNITED ELECTRICAL MANUFACTURING COMPANY, OF ADRIAN, MICHIGAN, A CORPORATION OF MICHIGAN.

STIRRING DEVICE FOR LIQUIDS.

Application filed June 30, 1928. Serial No. 289,336.

This invention relates to a device for stirring or beating soft drinks and other liquids by means of a stirring element which is inserted into the drinking cup or other receptacle containing the liquid to be stirred, the stirring element being supported and driven by an electric motor which is located above the receptacle when the device is operated.

The general object of the invention is to provide improved means for mounting the motor so that it will operate steadily, yet may be readily moved to permit the receptacle containing the liquid to be placed in position for operation.

A more specific object is to provide a construction whereby the motor is firmly supported in proper relation to the base on which the receptacle rests, so that there will be no tendency for the motor to vibrate or wabble.

The invention consists further in certain details of construction and an improved arrangement of the same, resulting in advantages which will be more particularly explained in connection with the accompanying drawings illustrating the preferred embodiment thereof.

In the drawings:—

Figure 1 is a side elevation of the invention, with parts shown in section.

Fig. 2 is a horizontal section taken on the line 2—2 of Fig. 1.

As illustrated in the drawings, the stirring device is mounted on a base 3, which is provided with a seat 4 for receiving the drinking cup or other receptacle 5. The base 3 has an extension 6 at one side, formed with an upwardly extending socket 7 in which a standard 8 is mounted, the standard being secured within the socket by a thumb screw 9 or other suitable means.

The stirring device is adapted to be driven by an electric motor 10 having a casing to which a handle 11 is secured, the electric current being supplied by wires 12 extending through the handle. The stirring element 13 is secured by any suitable means to the motor shaft and in alinement therewith. The motor 10 is mounted on a supporting member 14 which is formed with oppositely extending arcuate arms which are secured to the bottom of the motor casing by suitable means, such as the bolts 15 extending downwardly from said casing. This securing means is so arranged that, when properly mounted, the axis of the stirring element 13 is substantially perpendicular and is located centrally with respect to the curvature of the arms forming the supporting member 14. The rear end of this supporting member is turned downwardly, as at 16, and firmly secured in a bracket 17 which is adjustably mounted on the upper end of the standard 8 and is secured in its adjusted position by a thumb screw 18 or other suitable means.

When the motor 10 is mounted in the manner described and the bracket 17 secured in properly adjusted position, the motor casing is firmly held, with the axis of the stirring element 13 extending vertically and in alinement with the center of the receptacle 5. The motor is properly balanced so that it may be rotated at high speed with substantially no vibration, yet it can be readily detached if it is desired to use the motor for other purposes.

While I have shown and described in detail the preferred embodiment of the invention, it is obvious that various modifications may be made therein without departing from the scope of the invention as claimed.

What I claim is:

1. In a stirring device for liquids, the combination with a standard, of a bracket secured to the standard and having arms with spaced ends extending forwardly in a substantially horizontal plane therefrom, a motor having a casing resting upon said arms and rigidly and detachably secured thereto, with the shaft of said motor disposed vertically between the arms, and a stirring element secured to said shaft in depending relation to the motor.

2. In a stirring device for liquids, the combination with a base, of a standard secured to and rising from said base, a bracket adjustable about said standard as an axis and having arms with spaced ends extending forwardly in a substantially horizontal plane therefrom, means for securing said bracket in the position to which it is adjusted, a motor having a casing resting upon said arms and rigidly and detachably secured thereto with the shaft of the motor disposed vertically between the arms, and a stirring element secured to said shaft in depending relation to the motor.

3. In a stirring device for liquids, the combination with a base adapted to support a receptacle for the liquid, of a standard secured to said base and extending upwardly, a bracket secured to said standard, a supporting member rigidly secured to said bracket and having opposed arcuate arms, a motor having a casing rigidly secured to said arms with the shaft of the motor disposed vertically at the center of curvature of said arms, and a stirring element secured to said shaft below said arms.

4. In a stirring device for liquids, the combination with a standard, of a bracket adjustably secured to the standard and extending laterally therefrom, a supporting member secured to the bracket and having opposed arcuate arms, a motor having a casing secured at its bottom to said arcuate arms so that the latter are concentric with the motor shaft, said shaft being vertical, and a stirring element secured to said shaft below said arms.

5. In a stirring device for liquids, the combination with a base, of a standard secured to and rising from said base, a bracket adjustable about said standard as an axis, means for securing said bracket in the position to which it is adjusted, a supporting member rigidly secured to said bracket and having oppositely disposed arcuate arms extending in a horizontal plane, a motor having a casing the bottom of which is secured to the upper faces of said arms with the motor shaft extending vertially through the center of curvature of said arms, and a stirring element secured to said shaft beneath said arms.

In testimony whereof I have hereunto signed my name to this specification.

JOSEPH M. VOGEL.